United States Patent [19]

Scannell

[11] 4,252,352
[45] Feb. 24, 1981

[54] SEALING RING

[75] Inventor: John B. Scannell, Sandy, Utah

[73] Assignee: Parker-Hannifin Corporation, Cleveland, Ohio

[21] Appl. No.: 143,071

[22] Filed: Apr. 24, 1980

Related U.S. Application Data

[62] Division of Ser. No. 923,838, Jul. 12, 1978.

[51] Int. Cl.³ ............................................... F03B 5/00
[52] U.S. Cl. ............................................. 277/59; 277/152; 277/177; 277/205; 415/90; 416/4
[58] Field of Search ............... 415/90; 416/4; 277/59, 277/152, 173, 177, 205, 206

[56] References Cited

U.S. PATENT DOCUMENTS

| | | | |
|---|---|---|---|
| 2,386,873 | 10/1945 | Mercier | 277/177 |
| 2,836,450 | 5/1958 | Riesing | 277/152 |
| 3,259,392 | 7/1966 | Peickii et al. | 277/59 |
| 3,540,745 | 11/1970 | Flock | 277/205 |
| 3,650,632 | 3/1972 | Shanahan | 415/90 |
| 3,794,447 | 2/1974 | Bullough | 415/90 |
| 4,133,542 | 1/1979 | Janian | 277/152 |

*Primary Examiner*—Robert I. Smith
*Attorney, Agent, or Firm*—James A. Baker

[57] ABSTRACT

A sealing ring for a rotary shaft is disclosed. The sealing ring has a planar frusto-conical configuration and is received in an obliquely slanted groove provided in either the rotary shaft or the bearing surface surrounding the shaft. The use of an obliquely slanted groove causes seal contact over a wide area on the rotary shaft reducing heat buildup, while the frusto-conical configuration insures that the lips of the seal are in firm continuous circumferential contact with the shaft. Oblique mounting of the sealing ring also causes axial flow of the fluid being sealed and the formation of a fluid annulus adjacent the seal and on the pressure side thereof. Selective positioning of a plurality of obliquely mounted sealing rings results in the formation of complementary annuli and the axial flow of fluid between adjacent sealing rings.

6 Claims, 11 Drawing Figures

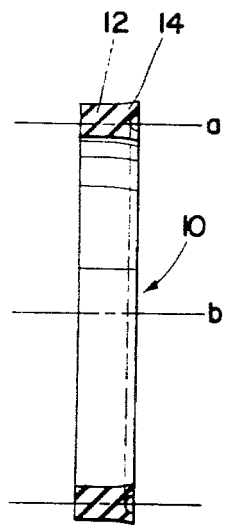
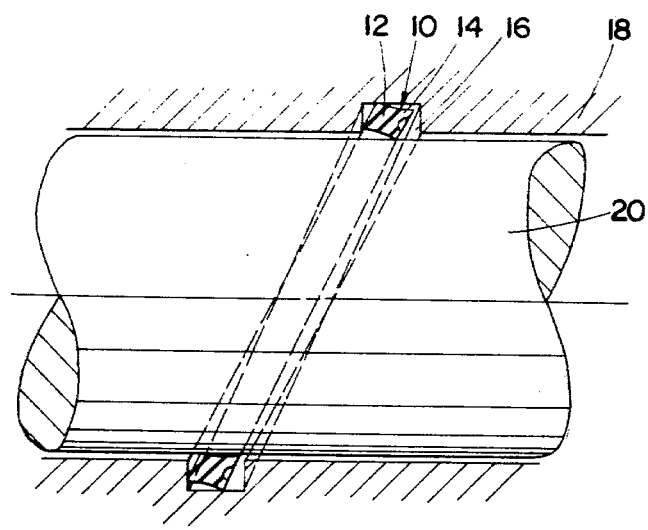
Fig.1 PRIOR ART
Fig.2 PRIOR ART
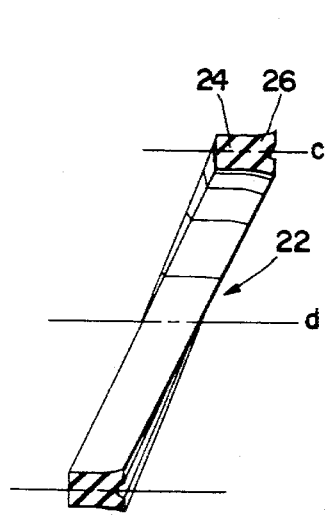
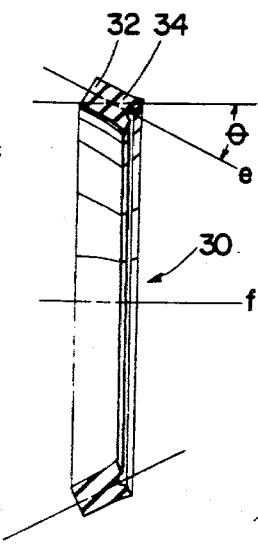
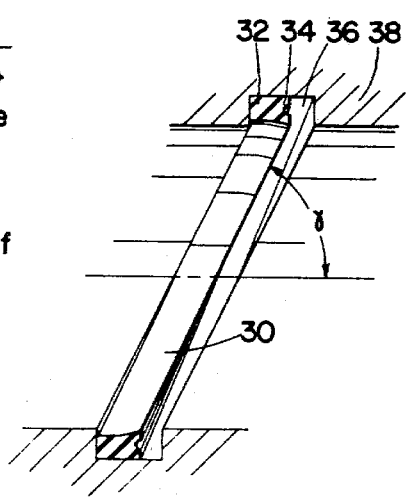
Fig.3   Fig.4   Fig.5

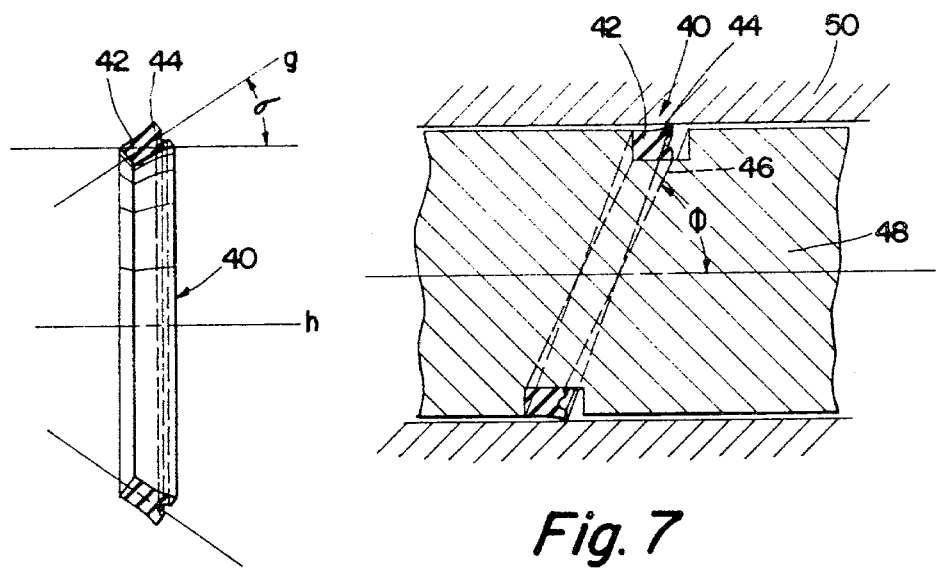
Fig. 6
Fig. 7
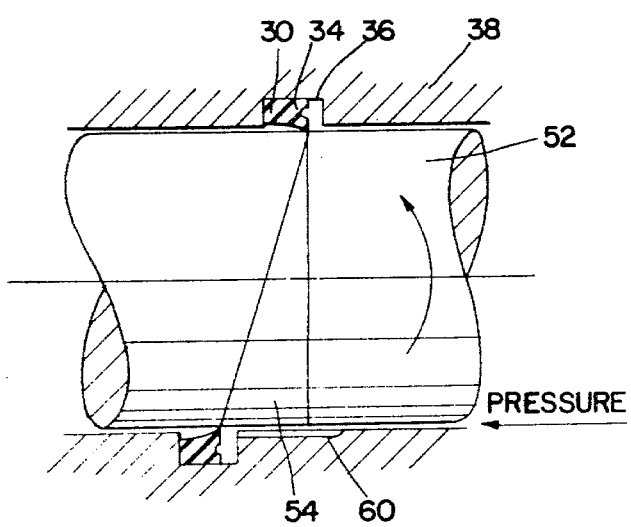
Fig. 8
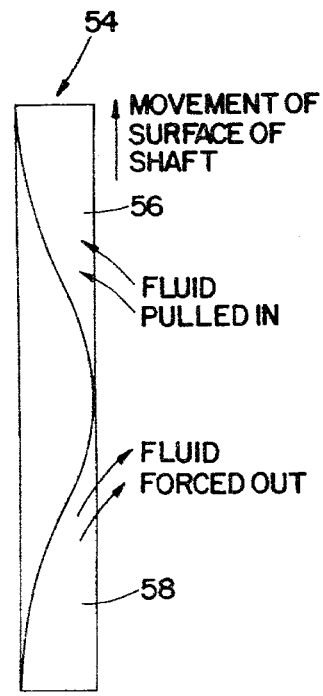
Fig. 9

SEALING RING

This is a division of application Ser. No. 923,838, filed July 12, 1978.

BACKGROUND OF THE INVENTION

1. Field of the Invention

This invention relates to sealing rings for rotary shafts and more particularly to sealing rings that are mounted obliquely on rotating shafts or in bearing surfaces surrounding such shafts to provide a greater sealing area on the shaft.

2. Description of the Prior Art

Rotary shafts are typically sealed with a conventional U-cup packing which is usually positioned so as to be perpendicular to the longitudinal axis of the shaft. In this orientation, the seal contact is limited to a narrow line on the shaft and the heat generated by the seal lip pressure and the shaft surface speed is confined to this small area. This heat is capable of quickly destroying the seal lip making the seal ineffective. One approach to alleviate this problem is to mount the seal obliquely with respect to the longitudinal axis of the shaft thus spreading the seal contact line over a much broader area. In this manner the heat generated is spread over a much greater surface area resulting in a much slower rate of heat buildup and a lower overall temperature increase. A seal mounted in this manner has a longer life and can be exposed to higher surface speeds and lip pressure. The primary disadvantage of this approach is that U-cup seals molded as conventional (planar) seals, i.e., where the plane of the seal is perpendicular to the longitudinal axis of the seal, and subsequently mounted obliquely on a rotary shaft do not have their sealing lips in the proper orientation with respect to the shaft to effectively seal same. Because of this lack of proper orientation, such oblique mounting of seals has been limited primarily to O-rings. To obtain the proper orientation of the seal lips, a U-cup seal with a non-planar configuration, i.e., where the plane of the seal is at an oblique angle with respect to the longitudinal axis of the seal, is required. The tooling costs for such a non-planar seal, however, are prohibitive.

Because of this, it has become desirable to develop a U-cup seal suitable for oblique mounting on a rotary shaft.

SUMMARY OF THE INVENTION

The present invention provides a solution to the aforementioned problem of obtaining proper orientation of the lip portion of a U-cup planar seal when mounted obliquely on a rotary shaft. This is accomplished by forming a planar seal with a frusto-conical configuration and placing this seal in a groove provided at an oblique angle in the bearing surface surrounding the rotary shaft. Because of the configuration of the seal, the distance from its longitudinal axis to the centerline through its heel and lip portions is greater for the heel portion than for the lip portion which results in circumferential compression of the heel portion by the groove and the twisting of the seal into a non-planar configuration with the lips assuming the proper sealing orientation with respect to the shaft. Alternatively, the seal can be formed in a frusto-conical configuration but with the distance from its longitudinal axis to the centerline through its heel and lip portions being greater for the lip portion than for the heel portion. When this seal is placed in a groove provided at an oblique angle in the rotary shaft, the heel portion is circumferentially stretched rather than compressed and the seal twists into a non-planar configuration with the lip portion in the proper sealing orientation relative to the shaft.

An inherent advantage resulting from the use of an obliquely mounted seal is the formation of an annulus of fluid on the rotary shaft adjacent the seal and on the high pressure side thereof. This fluid attempts to rotate with and adhere to the shaft creating an axial flow which assists in cooling the contact area on the rotary shaft. In another embodiment of the invention, grooves are provided in the bearing surface in order to help communicate the fluid to the annulus.

The axial flow resulting from the use of an obliquely mounted seal is used to advantage in still another embodiment of the invention. A series of seals are obliquely mounted on a rotary shaft so as to create one or more annuli having a low pressure area and a high pressure area. Because of this difference in pressure, a pumping action is obtained with fluid being introduced into the low pressure area of the annulus and being exhausted through the high pressure area. This pumping action assists in cooling the contact area of the seals on the rotary shaft and can also be used to effectively isolate one fluid from another fluid.

BRIEF DESCRIPTION OF THE DRAWINGS

FIG. 1 is a cross-sectional view of a conventional prior art planar U-cup seal with the centerline of the cross-section lying in a cylinder parallel to the longitudinal axis of the seal.

FIG. 2 is a partial cross-sectional view of a prior art seal of FIG. 1 obliquely mounted in a bearing surface surrounding a rotary shaft.

FIG. 3 is a cross-sectional view of a nonplanar seal with the centerline of the cross-section lying in a cylinder parallel to the longitudinal axis of the seal.

FIG. 4 is a cross-sectional view of a planar frusto-conical seal made in accordance with the present invention wherein the centerline of the cross-section lies in a cone and at an angle with respect to the longitudinal axis of the seal.

FIG. 5 is a partial cross-sectional view of the seal of FIG. 4 mounted in an obliquely slanted groove provided in the bearing surface surrounding the rotary shaft.

FIG. 6 is a cross-sectional view of another embodiment of a seal made in accordance with the present invention.

FIG. 7 is a cross-sectional view of the seal of FIG. 6 installed in an obliquely slanted groove in a rotary shaft.

FIG. 8 is a partial cross-sectional view of the seal of FIG. 4 mounted in an obliquely slanted groove provided in the bearing surface surrounding a rotary shaft and showing the annulus of fluid generated on the surface of the shaft.

FIG. 9 is an illustration of the annulus generated on the periphery of the shaft of FIG. 8 illustrating the axial flow of fluid with respect to the annulus.

DESCRIPTION OF THE PREFERRED EMBODIMENT

Figure 10:
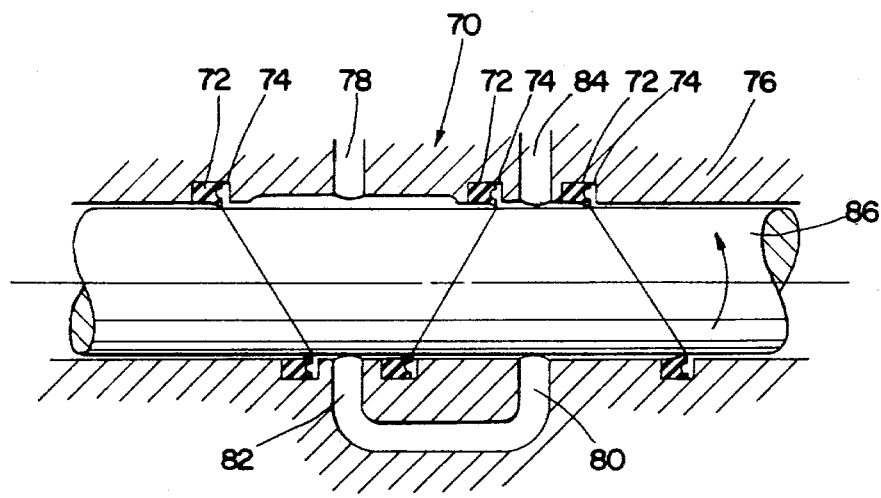
FIG. 10 is a partial cross-sectional view of a series of seals made in accordance with this invention and mounted in obliquely slanted grooves provided in the bearing surface surrounding a rotary shaft.

Referring now to the drawings, FIG. 1 shows a conventional prior art planar U-cup seal 10 having a heel portion 12 and a lip portion 14. The centerline a of the cross section of the seal is initially on a cylinder parallel to the lingitudinal axis b of the seal ring. When seal 10 is mounted in an obliquely slanted groove 16 provided in a bearing surface 18 to seal a rotary shaft 20 passing therethrough, as shown in FIG. 2, the cross-section of the seal will be distorted and the lip portion 14 will not apply uniform pressure on the shaft 20 throughout its circumference and may pull away from the shaft for a portion of its circumference. This lack of uniform circumferential pressure and/or contact of lip portion 14 on shaft 20 results in a very ineffective sealing action between bearing surface 18 and shaft 20.

This ineffective sealing action can be overcome by the use of a non-planar seal 22 shown in FIG. 3. In this seal, the heel portion 24 and lip portion 26 have a centerline c which is on a cylinder parallel to the longitudinal axis d of the seal ring. Because of the non-planar configuration of this seal, the seal twists on itself so that heel portion 24 and lip portion 26 are always oriented axially with respect to the longitudinal axis d of the seal ring. When this seal is installed in a slanted oblique groove provided in either the rotary shaft or in the surrounding bearing surfce, such axial orientation of the heel portion 24 and lip portion 26 results in continuous circumferential contact and uniform circumferential pressure of the lip portion 26 with the rotary shaft and the surrounding bearing surface. However, because of the non-planar and the twisted configuration of this seal, it is extremely difficult and costly to produce due to the complex tooling required.

The aforementioned problems are overcome by the present invention, which is shown in cross section in FIG. 4. In this figure, a seal 30 made of elastomeric material, such as nitrile or urethane rubber, and having a frusto-concial configuration is comprised of a heel portion 32 and a lip portion 34. Because of its frusto-concical configuration, the center line e of heel portion 32 and lip portion 34 lies in a cone at an angle e with respect to the longitudinal axis f of the seal. Angle $\theta$ is usually between 5° and 45°. In addition, the distance between the longitudinal axis f and the centerline of the cross section of seal is greater for the heel portion 32 than for the lip portion 34. Since the seal is planar in configuration, tooling costs are relatively inexpensive and it is simple to produce.

FIG. 5 shows seal 30 installed in an obliquely slanted groove 36 provided in bearing surface 38 that surrounds a rotary shaft (not shown). When so installed, heel portion 32 is compressed inwardly by groove 36 causing seal 30 to twist on itself resulting in heel portion 32 and lip portion 34 being oriented axially with respect to bearing surface 38 and the shaft. Such axial orientation results in lip portion 34 being in continuous circumferential contact with the shaft and bearing surface 38. Obliquely slanted groove 36 is located at an angle $\gamma$ with respect to the longitudinal axis of bearing surface 38 and is of sufficient width to receive seal 30 and allow it to twist on itself. Angle $\gamma$ should approximately complement angle $\theta$ so that when the seal 30 twists on itself, the orientation of the heel portion 32 and the lip portion 34 will be substantially parallel with the longitudinal axis of bearing surface 38 and the rotary shaft therethrough.

If it is desired that the seal be installed in an obliquely slanted groove in the rotary shaft, then a frusto-conical seal 40 comprised of a heel portion 42 and a lip portion 44 and having a configuration as shown in FIG. 6 is required. As in the previous embodiment, the centerline g of heel portion 42 and lip portion 44 lies in a cone at an angle $\sigma$ with respect to the longitudinal axis h of the seal, however, the distance between the longitudinal axis and the center line g is greater for the lip portion 44 than for the heel portion 42. Angle $\sigma$ is usually between 5° and 45°, as in the previous embodiment. In order to install seal 40 in an obliquely slanted groove 46 in rotary shaft 48, as shown in FIG. 7, heel portion 42 must be circumferentially stretched. Such stretching causes heel portion 42 and lip portion 44 to be oriented axially with respect to shaft 48 and bearing surface 50 surrounding shaft 48 resulting in lip portion 44 being in continuous circumferential contact with shaft 48 and bearing surface 50. To insure the proper axial orientation of lip portion 42, obliquely slanted groove 46 is located at an angle $\phi$ with respect to the longitudinal axis of rotary shaft 48 and is of sufficient width to receive seal 40 and allow it to twist on itself. Angle $\phi$ should approximately complement angle $\sigma$, as in the previous embodiment, so that the orientation of lip portion 44 and heel portion 42 will be substantially parallel with the longitudinal axis of shaft 48 and bearing surface 50 after installation.

When seal 30 is installed in groove 36 provided in bearing surface 38, as in FIG. 5, and a shaft 52 is received through seal 30 and is allowed to rotate therein, an annulus 54 of the fluid being sealed is formed on shaft 52 adjacent seal 30 and on the pressure side thereof, as shown in FIG. 8. This annulus is caused by the inner surface of the fluid attempting to rotate with and adhere to the shaft while the outer surface tends to adhere to the bearing surface which results in the creation of an axial flow which assists in cooling the contact area of shaft 52. This flow is illustrated in FIG. 9 which shows the annulus 54 generated on the surface of shaft 52. Annulus 54 has a low pressure portion shown generally by the numeral 56 and a high pressure portion shown generally by the numeral 58. In the low pressure portion 56, the fluid has a tendency to flow axially toward the seal creating a suction effect, whereas in the high pressure portion 58, the fluid is sheared away from the seal and has a tendency to move axially away therefrom. Such relative axial movement of the fluid on the surface of shaft 52 creates an axial flow which augments the cooling effect on shaft 52 resulting from the increased contact area of lips 34 on shaft 52. This axial movement of fluid on the surface of shaft 52 can be increased by providing grooves 60 in the bearing surface 38 on the pressure side of seal 30 so that a sufficient supply of fluid can be provided to the low pressure portion 56 of annulus 54.

Figure 11:
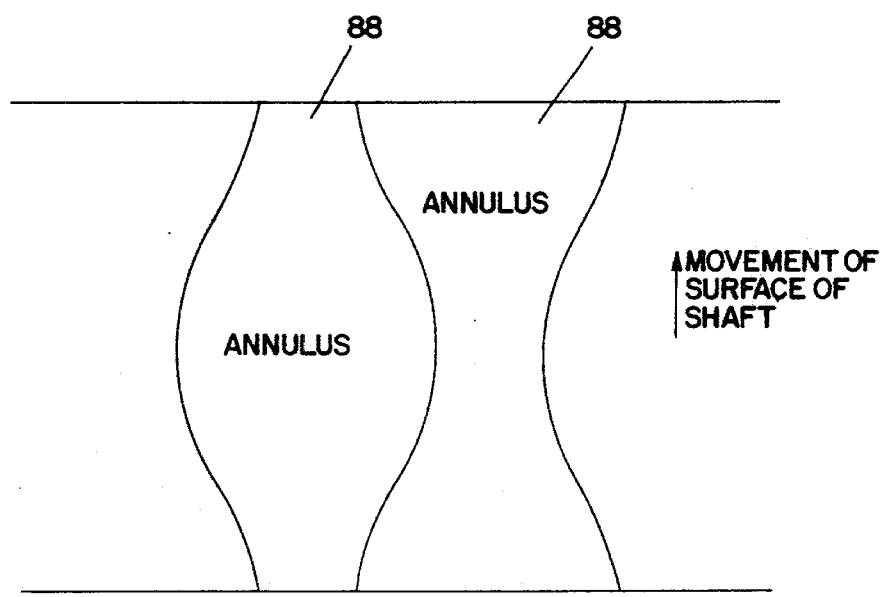
FIG. 11 is an illustration of the annuli generated by the seals in FIG. 10.

The tendency of the fluid to move axially toward the seal in the low pressure portion of the annulus and to move axially away therefrom in the high pressure portion can be used to develop a form of pumping device. Such a device is shown in FIG. 10, wherein a sealing gland 70 is illustrated using a plurality of seals 72 installed in oppositely directed obliquely slanted grooves 74 provided in bearing surface 76, and including inlet ports 78,80 and outlet ports 82,84. When shaft 86 is rotated, complementary annuli 88 are formed thereon, as illustrated in FIG. 10 and 11. If a low pressure fluid is introduced through inlet port 78, it will have a greater pressure when exhausted through outlet port 82. If this fluid is then communicated to inlet port 80, it will have a still greater pressure when exhausted through outlet port 84. In essence, because of the generation of fluid annuli having a low and a high pressure area, sealing gland 70 acts as a pump. A possible application for this sealing arrangement occurs in the sealing of a noxious fluid. In such an application, the noxious fluid would be located to the right of the seal installation and a neutral fluid would be introduced through inlet port 78 and communicated through ports 82,80 to outlet port 84. In this way any leakage of the noxious fluid past the far right hand seal would be diluted by the neutral fluid and exhausted through outlet port 84 and any leakage of fluid past the far left hand seal would be exclusively the neutral fluid.

Variations of the present invention will be apparent to those having ordinary skill in the art and the invention is limited only by the spirit and scope of the following claims.

I claim:

1. In combination a shaft, a bearing surface surrounding said shaft, and a plurality of sealing rings, one of said shaft and said bearing surface having a plurality of oppositely directed obliquely slanted grooves therein around the periphery thereof, each of said sealing rings having a base portion and a sealing portion and having a frusto-conical configuration, each of said sealing rings being received in one of said oppositely directed obliquely slanted grooves and being contacted thereby causing alignment of said sealing portion thereof with the longitudinal axis of said shaft and said bearing surface.

2. The combination as defined in claim 1 wherein said oppositely directed obliquely slanted grooves are located at an angle with respect to the longitudinal axis of said shaft and said bearing surface that approximately complements the angle between the centerline through said base portion and said sealing portion and the longitudinal axis of said sealing rings.

3. The combination as defined in claim 1 wherein an annulus of the fluid being sealed is formed between adjacent sealing rings as said shaft rotates within said bearing surface.

4. The combination as defined in claim 3 further including inlet means and outlet means in said bearing surface, said inlet means communicating a fluid at a first pressure into said annulus and said outlet means communicating said fluid at a second pressure from said annulus, said second pressure being higher than said first pressure.

5. The combination as defined in claim 4 wherein said inlet means and said outlet means are located radially opposite each other in said bearing surface.

6. The combination as defined in claim 3 further including a plurality of inlet means and a plurality of outlet means in said bearing surface, said inlet means and said outlet means being located in said bearing surface so that one inlet means and one outlet means are between adjacent sealing devices, at least one of said outlet means being fluidically connected to one of said inlet means allowing fluid to pass through a plurality of annuli, each of said annuli being formed between adjacent sealing rings.

* * * * *